US006318684B1

(12) United States Patent
Ireland et al.

(10) Patent No.: US 6,318,684 B1
(45) Date of Patent: Nov. 20, 2001

(54) FLIP-UP VALANCE FOR MERCHANDISING FIXTURE

(75) Inventors: David S. Ireland, Akron; Jeffry A. Myler, Stow, both of OH (US)

(73) Assignee: Darko Company, Inc., Twinsburg, OH (US)

( * ) Notice: Subject to any disclaimer, the term of this patent is extended or adjusted under 35 U.S.C. 154(b) by 0 days.

(21) Appl. No.: 09/490,428

(22) Filed: Jan. 24, 2000

(51) Int. Cl.$^{7}$ .................................................... F16M 11/00

(52) U.S. Cl. ............................ 248/201; 40/606; 211/104; 108/77

(58) Field of Search ............................... 108/77, 27, 108; 211/104, 183, 90.01, 134, 90.04; 40/606, 651, 657, 574, 790, 791, 649; 16/331, 332, 387, 389, 390; 248/201

(56) References Cited

U.S. PATENT DOCUMENTS

| | | | | |
|---|---|---|---|---|
| 473,919 | * | 5/1892 | Edsall | 248/291 |
| 3,550,891 | * | 12/1970 | Scott | 108/6 |
| 4,323,162 | * | 4/1982 | Steinhilber | 211/100 |
| 4,407,476 | * | 10/1983 | Bohannan | 248/235 |
| 4,805,331 | * | 2/1989 | Boggess et al. | 40/651 |
| 5,437,116 | * | 8/1995 | Hardy | 40/605 |
| 5,860,537 | * | 1/1999 | Loew | 211/104 |
| 5,924,367 | * | 7/1999 | Henke et al. | 108/108 |
| 6,003,697 | * | 12/1999 | Ferchat et al. | 211/189 |

OTHER PUBLICATIONS

Installation Instructions for a product manufactured by RTC Industries, Rolling Meadows, Illinois (6/97).

* cited by examiner

*Primary Examiner*—Anita M. King
*Assistant Examiner*—Kimberly Wood
(74) *Attorney, Agent, or Firm*—Renner, Kenner, Greive, Bobak, Taylor & Weber

(57) ABSTRACT

A valance assembly (10) for a merchandising fixture (11) includes a bracket (15) positioned at both longitudinal ends of the valance assembly (10) and adapted to be connected to the fixture (11). An arm (16) is pivotally carried by each bracket (15), and a panel (39) extends between the arms (16). The panel (39) is formed with a nose (40) at one lateral edge thereof and an attachment assembly (41) along the other lateral edge thereof. The longitudinal edges of the nose (40) and the attachment assembly (41) are received in a hollowed-out area (29) formed in each of the arms (16), and the panel (39) is connected to the arms (16) at that location. Each bracket (15) includes a flexible arm (26) having a notch (27) therein. Each arm (16) includes a cam surface (35) having a lug (36) formed thereon. When the arms (16) are pivoted relative to the brackets (15) to move the panel (39) from a generally vertical orientation to a generally horizontal orientation, the cam surface (35) deflects the flexible arms (26) until the lug (36) is received in the notch (27) which thereby holds the panel (39) in the horizontal orientation.

20 Claims, 5 Drawing Sheets

FLIP-UP VALANCE FOR MERCHANDISING FIXTURE

TECHNICAL FIELD

This invention relates to signage for a retail merchandising display fixture. More particularly, this invention relates to such signage in the form of a valance for the fixture which can be positioned in a closed, normal position, or in an open position to gain access to items which might be positioned behind the valance. More specifically, the structure of the present invention allows the signage to be illuminated.

BACKGROUND ART

Retailers are constantly seeking eye-catching ways to promote or otherwise identify items being displayed on their merchandising fixtures. While there are numerous methods of doing so, one popular concept is to present graphics relating to the merchandise on a valance-type configuration located at or near the top of the fixture. Some such valances have been back lighted to provide the effect of an illuminated signage. In its simplest form, such an illuminated valance may merely take the form of a light-containing box positioned on a shelf. However, such is expensive, takes up valuable shelf space, and is difficult to maintain, such as when the light source must be replaced.

Other types of valances advantageously serve to hide additional inventory of the merchandise being displayed or other items used by the retailer. These types of valances could be illuminated as well and usually include a hinged panel which hangs down and carries the signage. The problem with these devices arises when access must be gained to whatever is positioned behind the panel. The user must either hold the panel up with one hand, thereby freeing only the other hand to manipulate items behind the panel, or some secondary component, such as prop rods or the like, must be utilized to hold the panel in the up position. Such is not only inconvenient and mechanically complex, but also can increase the cost of the unit and, if not properly operated, can cause damage to the panel.

As a result, the need exists for a valance for a retail display fixture which is inexpensive and which is easy to operate, from an open to closed position, and which can be readily illuminated, if desired.

DISCLOSURE OF THE INVENTION

It is thus an object of the present invention to provide a graphic-carrying valance for a merchandising fixture which is readily positionable in an open or closed condition.

It is another object of the present invention to provide a valance, as above, which can be locked in the open position and readily unlocked to move it to the closed position.

It is a further object of the present invention to provide a valance, as above, which is formed of a light-weight but wear-resistant plastic material thereby rendering it strong and durable and yet economically produceable.

It is an additional object of the present invention to provide a valance, as above, in which a portion thereof is formed of a translucent material thereby rendering it to be adapted for back lighting.

It is yet another object of the present invention to provide a valance, as above, which can readily receive and carry a graphic image such that the graphic image can be easily changed, as desired.

It is still a further object of the present invention to provide a valance, as above, which can be utilized with almost any style of merchandising fixtures.

It is still another object of the present invention to provide a valance, as above, which can be readily cut to any length, as may be desired by the user.

These and other objects of the present invention, as well as the advantages thereof over existing prior art forms, which will become apparent from the description to follow, are accomplished by the improvements hereinafter described and claimed.

In general, in accordance with one aspect of the present invention, a graphic display device for a merchandising fixture includes longitudinally spaced arms and bracket assemblies adapted to be attached to the fixture. Each one of the bracket assemblies pivotally carries one of the arms. A panel extends between and is carried by the arms, the panel thereby being rotatable from a generally vertical orientation to a generally horizontal orientation. The arms and the brackets interconnect at one relative position to hold the panel in the generally horizontal orientation.

In accordance with another aspect of the present invention, a graphic display device for a merchandising fixture includes a first arm and a second arm spaced from the first arm. A first bracket assembly pivotally carries the first arm and is adapted to be attached to the fixture. A second bracket assembly pivotally carries the second arm and is adapted to be attached to the fixture. A panel extends between and is carried by the first and second arms. The first and second bracket assemblies each include a flexible arm having a notch therein, and the first and second arms each include a cam surface to engage the flexible arm of the respective first and second bracket assemblies. Each cam surface has a lug to be received in a notch of the respective first and second bracket assemblies. The panel is thereby held in one position when the lugs are received in the notches.

A preferred exemplary valance for a merchandising fixture incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
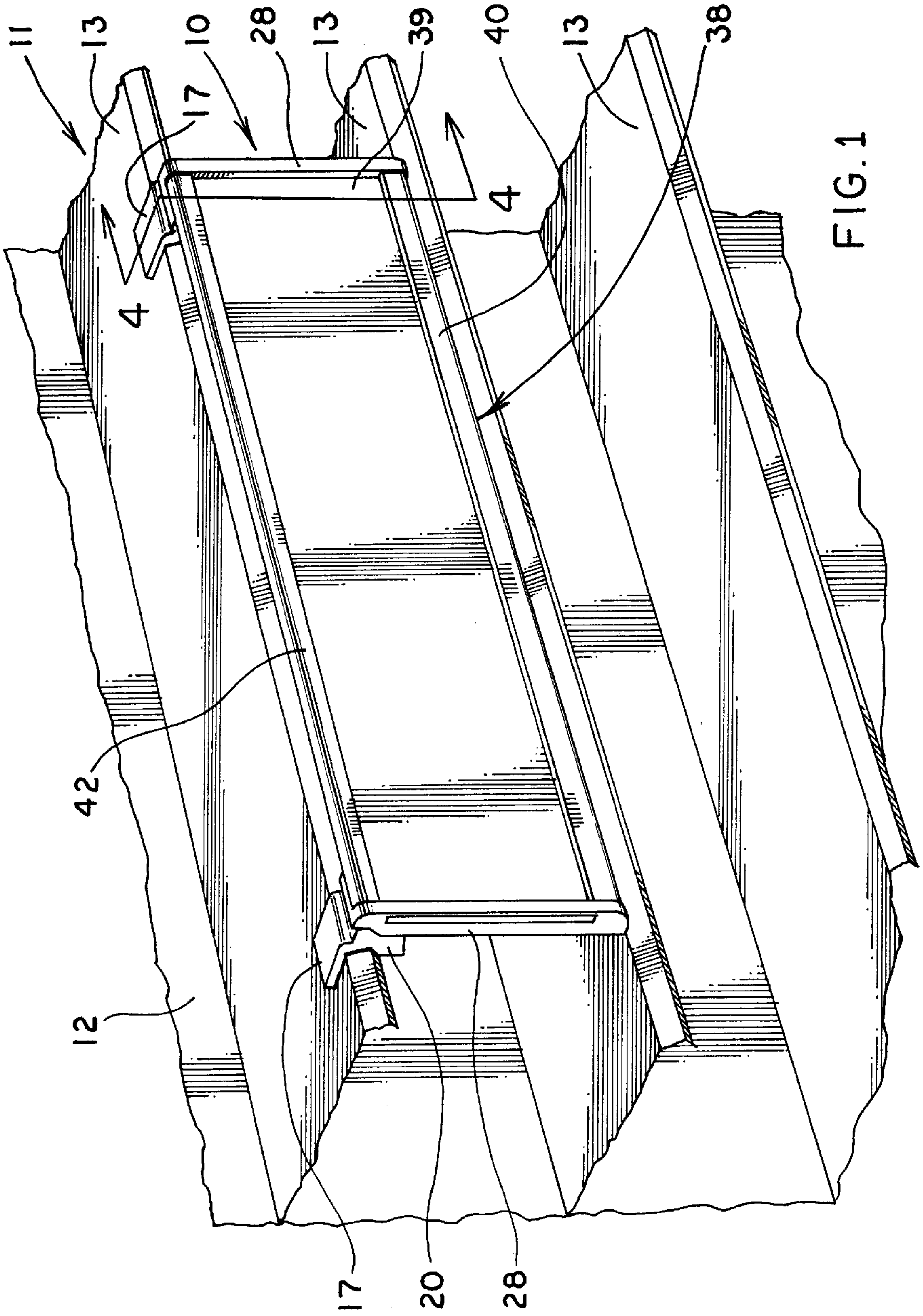
FIG. 1 is a somewhat schematic, fragmented perspective view of a merchandising fixture carrying a valance assembly of the present invention, the valance panel being shown in the closed or operative position.

A valance assembly made in accordance with the present invention is generally indicated by the numeral 10 and can be carried by a conventional merchandising fixture such as the shelving unit shown and generally indicated by the numeral 11. Fixture 11 includes a back wall 12 having a plurality of vertically spaced shelves 13 extending outwardly therefrom. As will hereinafter be described in more detail, at least one shelf 13, usually near or at the top of fixture 11, carries valance assembly 10. As indicated above, it should be appreciated that fixture 11 need not be in the form of a shelving unit. For example, a unit including a back wall 12 in the form of conventional pegboard could carry arms extending outwardly therefrom, and then those arms could carry valance assembly 10.

Valance assembly 10 includes a bracket and arm assembly, generally indicated by the numeral 14, at each longitudinal end thereof. Bracket and arm assemblies 14 each include a bracket assembly generally indicated by the numeral 15 and an arm assembly extending outwardly therefrom and generally indicated by the numeral 16. Bracket assembly 15 is preferably fabricated out of a sturdy plastic material such as a polyaceta or acetate resin sold under the name DELRIN by DuPont. Arm assemblies 16 are likewise preferably formed of a sturdy plastic material, such as polypropylene, and are generally identical except that one arm assembly 16 is a "left hand" version, and the other is a "right hand" version. That is, the arm assemblies 16 are always on the longitudinal outside of valance assembly 10 with identical bracket assemblies 15 positioned longitudinally inwardly therefrom.

Each bracket assembly 15 includes a mounting plate 17 which is provided with a plurality of strengthening ribs 18 and a plurality of apertures 19 extending through plate 17. Plate 17 is adapted to be generally horizontally positioned on a shelf 13 or other mounting component of a fixture 1 1 and attached thereto by fasteners (not shown) received through apertures 19. The size, that is, the height of ribs 18 should be such so as not to unduly raise any item of merchandise which might be resting, at least partially, on a bracket assembly 15 when positioned on shelf 13.

Figure 2:
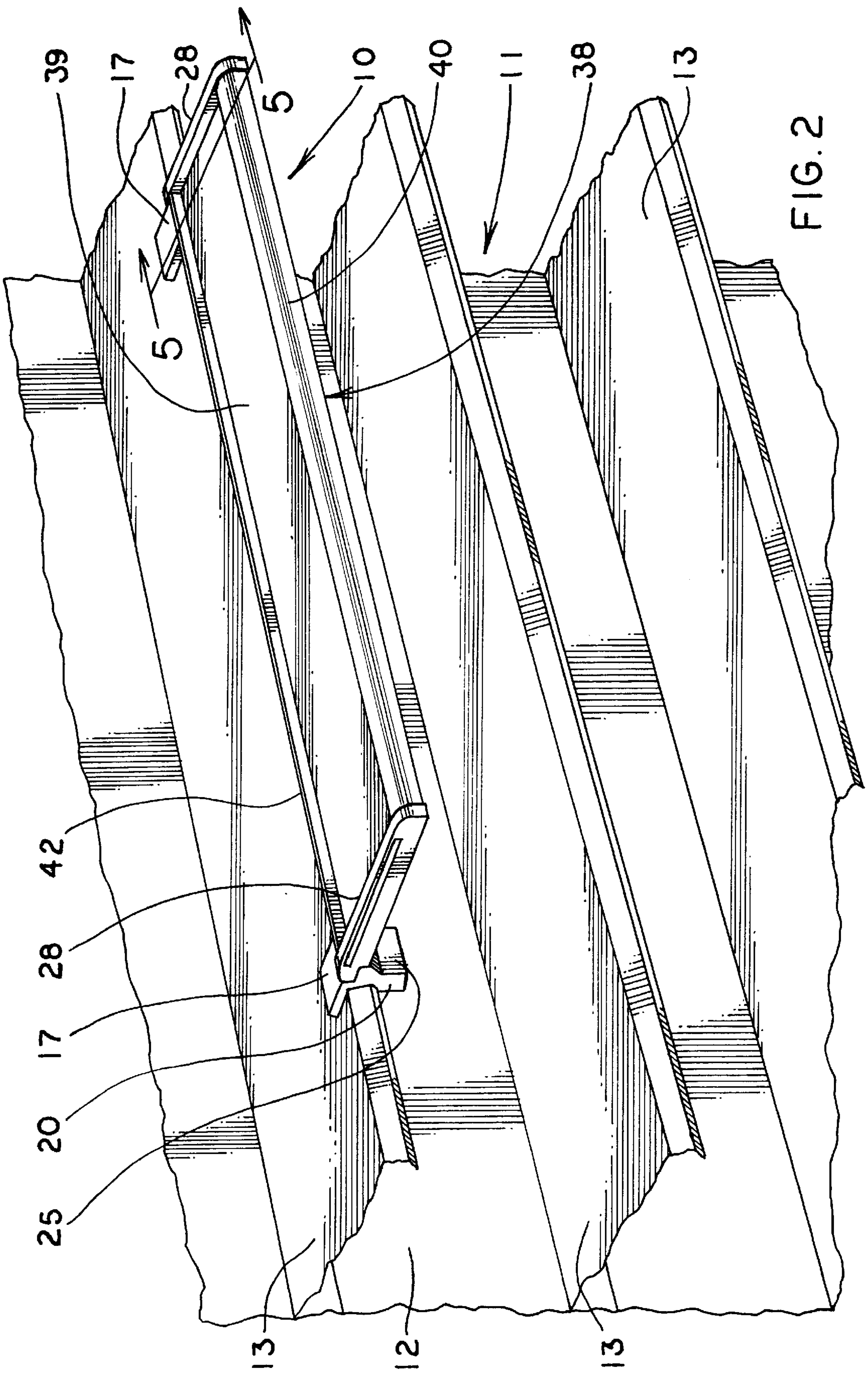
FIG. 2 is a somewhat schematic, fragmented, perspective view like FIG. 1 but showing the valance panel in an open position.
Figure 3:
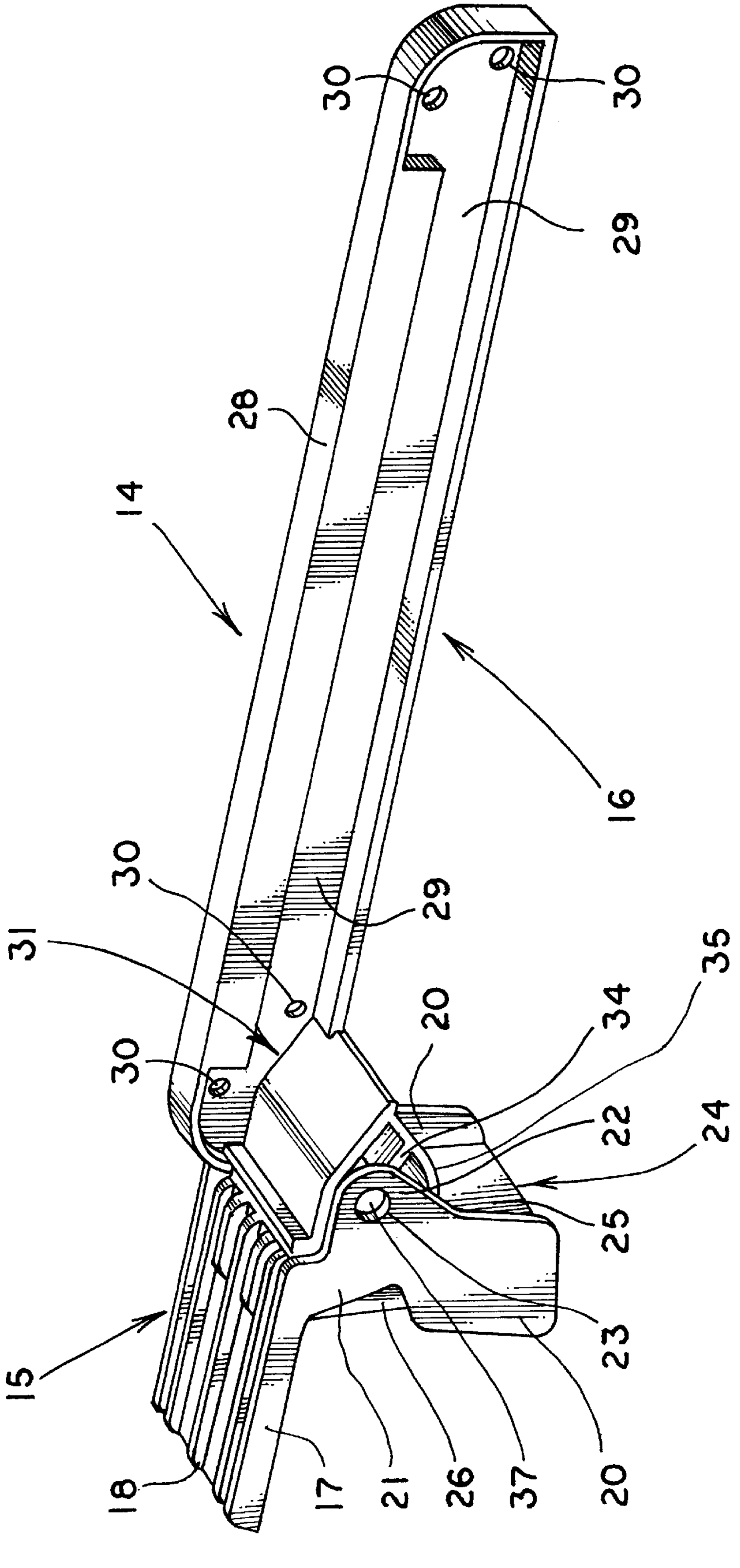
FIG. 3 is a perspective view of a bracket and arm component of the valance assembly of the present invention.

Spaced arms 20 extend downwardly from plate 17 in front of a shelf 13 and include a rear surface 21 adapted to rest against the front of a shelf 13. Each arm 20 also includes an ear portion 22 having an aperture 23 therein. A cross plate generally indicated by the numeral 24 extends between arms 20 and includes a lower portion 25 affixed to arms 20 and an upper, flexible spring arm portion 26 (FIGS. 4 and 5) which is not affixed to arms 20. Spring arm portion 26 is provided with an arm-retaining, V-shaped notch 27 which, as will be hereinafter described, cooperates with arm assembly 16 to hold arm assembly 16 in the open position as shown in FIGS. 2 and 5.

Each arm assembly 16 includes an elongate arm 28 adapted to extend outwardly from bracket assembly 15. Arm 28 includes a hollowed out area 29 with a plurality of apertures 30 extending therethrough at each end of arm 28. The inner end of each arm 28 is provided with a cam member generally indicated by the numeral 31. Cam member 31 includes a central hub 32 having an aperture 33 therethrough and a plurality of spokes 34 radiating therefrom to an outer cam surface 35. A V-shaped lug 36 is formed on cam surface 35 and, as shown in FIG. 5, is adapted to be received in notch 27 of spring arm 26. A pivot pin 37 is received through aperture 33 and extends into the opposed apertures 23 in arms 20. As a result, each arm assembly 16 is pivotable relative to its bracket assembly 15.

Arm assemblies 16 are adapted to receive a longitudinally extending valance panel assembly, generally indicated by the numeral 38, therebetween. Valance panel assembly 38 includes, as its main component, a longitudinally extending panel 39 which is formed integrally with a longitudinally extending bottom nose assembly 40 and with a longitudinally extending upper attachment assembly 41. Panel assembly 38 is preferably co-extruded of an acrylonitrilebutadiene-styrene (ABS) material such that panel 39 is translucent, whereas the bottom end thereof, that is, nose assembly 40, is opaque. Panel assembly 38 also includes an opaque upper nose assembly 42 which is separately molded from panel 39, nose assembly 40, and attachment assembly 41. In addition to functioning as hereinafter described, nose assemblies 40 and 42 provide a finished look to panel 39 as it extends between arms 28.

Figure 4:
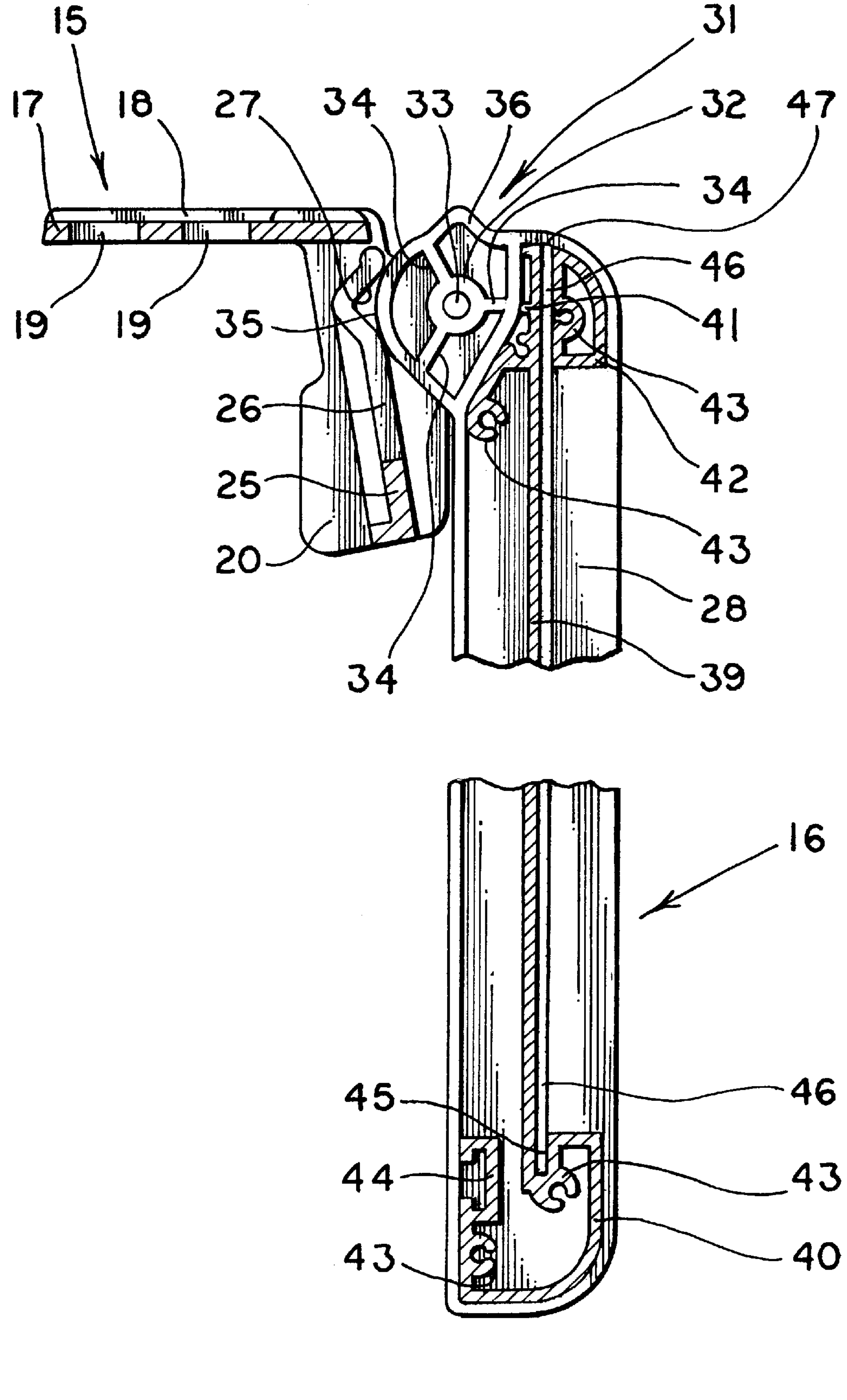
FIG. 4 is a sectional view taken substantially along line 4—4 of FIG. 1.
Figure 5:
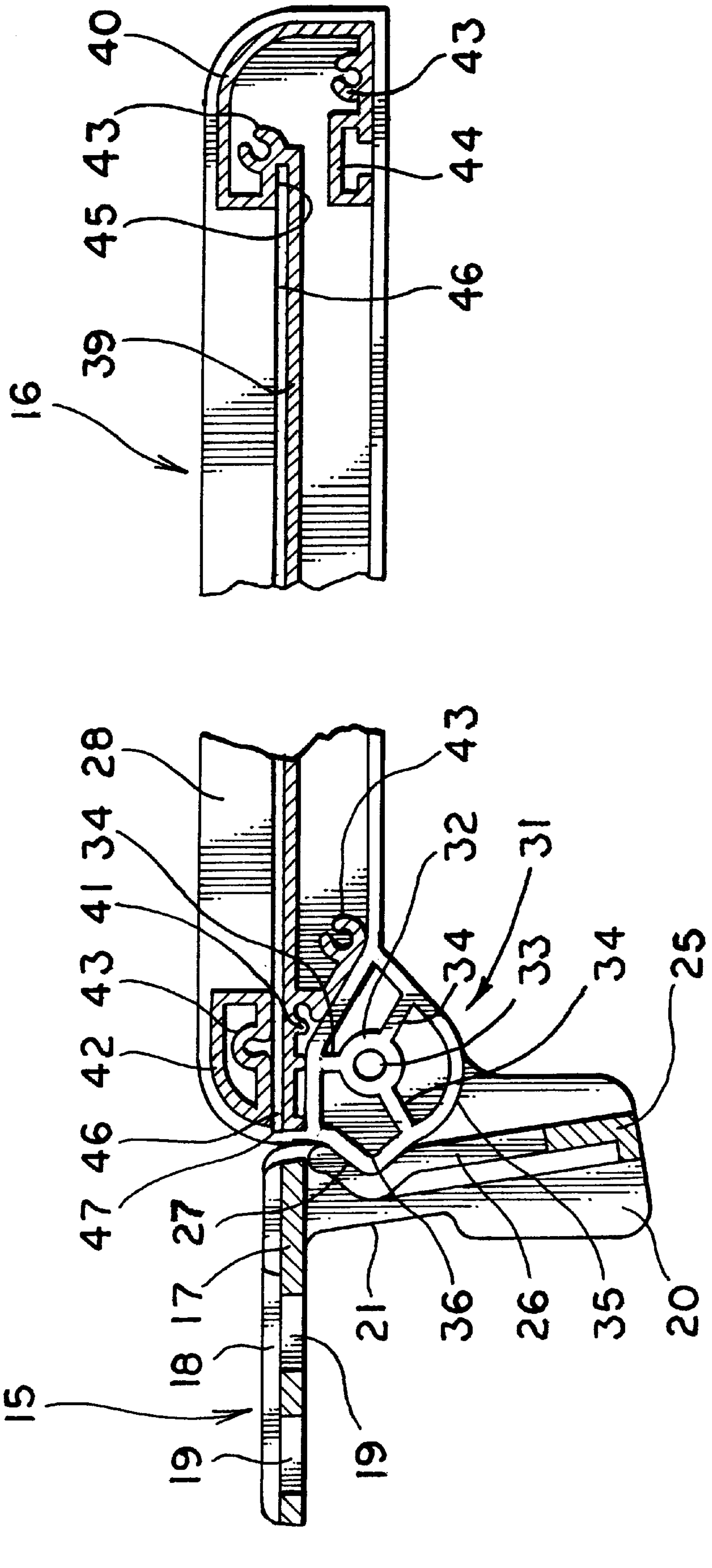
FIG. 5 is a sectional view taken substantially along line 5—5 of FIG. 2.

As shown in FIGS. 4 and 5, the longitudinal ends of panel assembly 38 are received in hollowed out area 29 of opposed arms 28 and are adapted to be secured to arms 28. To that end, bottom nose assembly 40, upper attachment assembly 41 and upper nose assembly 42 are provided with a plurality of lugs 43 which are aligned with apertures 30 of arms 28. Suitable fasteners, such as screws (not shown), may then be inserted through apertures 30 and into lugs 43 to rigidly attach panel assembly 38 to arms 28.

Bottom nose assembly 40 may also be provided with a latch lug 44 which could be utilized to snap onto the shelf 13 below the shelf 13 that carries bracket assemblies 15. Thus, when in the down or operative, FIG. 1, position, valance panel assembly 38 will be held in place, with panel 39 thereby being generally vertically oriented.

Bottom nose assembly 40 also includes a slot 45 which is adapted to receive the lower end of a sheet of graphics (not shown). The upper end of the graphic sheet is maintained in a slot 46 formed between upper attachment assembly 41 and upper nose assembly 42. Slot 46 thus has an open upper end 47, and the graphic sheet may readily be received by arm assembly 16 by merely inserting it through end 47 and downwardly through slot 46 and into slot 45. As such, the graphics for the merchandise being carried by fixture 11 can readily be changed, as desired, without having to disassemble valance assembly 10. Moreover, because the graphic sheet will be positioned against and be co-extensive with panel 39, and because panel 39 is translucent, if the user desires an illuminated graphic, a light source may be positioned behind panel 39 on shelf 13 or in a back light fixture conveniently positioned behind panel 39. Finally, the structure described herein can be readily adapted for any length graphic sheet desired to be employed by the user. For example, if a panel assembly 38 of six feet in length between assemblies 14 has been initially provided to the user, and if he were to desire a shorter panel, all that need be done is to laterally cut panel 39, nose assembly 40 and attachment assembly 41 to the desired length and insert the panel assembly 38 of a now shorter length into arms 28, as previously described.

In view of the foregoing, it should be apparent that an assembled valance assembly can be readily attached to a fixture, and when in the generally vertical position shown in FIG. 1, can readily display information regarding the products being displayed for sale on the fixture. In the event that the user requires access to the area behind panel 39 where, for example, additional inventory of the products may be stored or, for example, if the panel is illuminated, to gain access to the light source, the user need only lift and rotate panel 39 and arms 28 on pin 33 to the generally horizontal position shown in FIG. 2. As such, cam surface 35 of cam member 31 deflects spring arm portion 26 of cross plate 24 until lug 36 is received in notch 27, as shown in FIG. 5. When panel 39 is thus held in the horizontal position in view of the interconnection between arms 28 and bracket assemblies 15, there is easy access to anything positioned on the shelf 13 behind panel 39. To reach such a horizontal position, as shown, cam member 31 has been rotated approximately ninety degrees. However, if the weight of panel 39 and its associated members is such that it might sag from horizontal after a ninety degree rotation, it should be evident that cam member 31 could be designed for a rotation of slightly more than ninety degrees which would account for such sagging to provide the desired generally horizontal positioning of panel 39.

It should thus be evident that a valance panel assembly constructed and utilized as described herein substantially improves the art and otherwise accomplishes the objects of the present invention.

What is claimed is:

1. A graphic display device for a merchandising fixture comprising longitudinally spaced arms, said arms being elongate having an inner end and an outer end, bracket assemblies adapted to be attached to the fixture, each one of said bracket assemblies pivotally carrying the inner end of a said arm, and a panel extending longitudinally between said arms and having laterally extending edges carried between the inner and outer ends of said arms, said panel thereby being rotatable from a generally vertical orientation to a generally horizontal orientation, said arms and said bracket assemblies interconnecting at one relative position to hold said panel in the generally horizontal orientation.

2. A device according to claim 1, said bracket assemblies including a flexible arm, and said longitudinally spaced arms including a cam surface which moves said flexible arm upon pivoting of said longitudinally spaced arms relative to said bracket assemblies.

3. A device according to claim 2 wherein said flexible arm has a notch therein and said cam surface has a lug thereon, said lug being received in said notch to hold said panel in the generally horizontal position.

4. A device according to claim 1, said bracket assemblies having spaced arms and said longitudinally spaced arms including a cam member, and further comprising a pivot pin extending through said cam member and into said spaced arms of said bracket assemblies.

5. A device according to claim 4, said bracket assemblies including a generally horizontally extending mounting plate carried by said spaced arms of said bracket assemblies, said mounting plate being adapted to be attached to the fixture.

6. A device according to claim 4, said bracket assemblies including a plate extending between said spaced arms of said bracket assemblies, said plate having a flexible portion, and said cam member including a cam surface which moves said flexible portion upon pivoting of said cam member on said pivot pin.

7. A device according to claim 6 wherein said flexible portion has a notch therein and said cam surface has a lug thereon, said lug being received in said notch to hold said panel in the generally horizontal position.

8. A device according to claim 1 further comprising a nose assembly extending longitudinally along one longitudinal edge of said panel, and an attachment assembly extending longitudinally along the other longitudinal edge of said panel.

9. A device according to claim 8 wherein said panel, said nose assembly, and said attachment assembly are co-extruded of a plastic material, said panel being translucent, and said nose assembly being opaque.

10. A device according to claim 8, said nose assembly having a slot therein adapted to receive a graphic display sheet.

11. A device according to claim 8 wherein each said arm includes a hollowed-out area, said hollowed-out area of one of said arms opposing the hollowed-out area of the other of said arms, the longitudinally spaced edges of said nose assembly and said attachment assembly being received in said hollowed-out areas.

12. A device according to claim 11 further comprising a second nose assembly extending longitudinally along the other edge of said panel, the longitudinally spaced edges of said second nose assembly being received in said hollowed-out area.

13. A graphic display device for a merchandising fixture comprising longitudinally spaced arms, bracket assemblies adapted to be attached to the fixture, each one of said bracket assemblies pivotally carrying a said arm, a panel extending longitudinally between and carried by said arms, said panel thereby being rotatable from a generally vertical orientation to a generally horizontal orientation, said arms and said bracket assemblies interconnecting at one relative position to hold said panel in the generally horizontal orientation, a first nose assembly extending longitudinally along one edge of said panel, a second nose assembly extending longitudinally along the other edge of said panel, and an attachment assembly extending longitudinally along the other edge of said panel, said second nose assembly being spaced from said attachment assembly to provide a slot adapted to receive a graphic display sheet therethrough.

14. A device according to claim 13, said first nose assembly having a slot therein aligned with said slot formed between said second nose assembly and said attachment assembly and adapted to receive a graphic display sheet so that the graphic display sheet can be maintained in said slot of said first nose assembly and said slot formed between said second nose assembly and said attachment assembly to thereby maintain the graphic display sheet adjacent to said panel.

15. A graphic display device for a merchandising fixture comprising a first arm, a second arm spaced from said first arm, a first bracket assembly pivotally carrying said first arm and adapted to be attached to the fixture, a second bracket assembly pivotally carrying said second arm and adapted to be attached to the fixture, and a panel extending between and carried by said first and second arms, said first and second bracket assemblies each including a flexible arm having a notch therein, said first and second arms each including a cam surface to engage said flexible arm of the respective said first and second bracket assemblies, each said cam surface having a lug to be received in said notch of the respective said first and second bracket assemblies, said panel thereby being held in one position when said lugs are received in said notches.

16. A device according to claim 15 further comprising a nose assembly extending longitudinally along one edge of said panel and an attachment assembly extending longitudinally along the other edge of said panel.

17. A device according to claim 16 wherein each said arm includes a hollowed-out area, said hollowed-out area of said first arm opposing said hollowed-out area of said second arm, the longitudinal edges of said nose assembly and said attachment assembly being received in said hollowed-out areas.

18. A device according to claim 17 further comprising a second nose assembly extending longitudinally along the other edge of said panel, the longitudinal edges of said second nose assembly being received in said hollowed-out area.

19. A device according to claim 18, wherein said second nose assembly is spaced from said attachment assembly to provide a slot adapted to receive a graphic display sheet therethrough.

20. A device according to claim 19, said nose assembly having a slot therein aligned with said slot formed between said second nose assembly and said attachment assembly and adapted to receive a graphic display sheet so that the graphic display sheet can be maintained in said slot of said nose assembly and said slot formed between said second nose assembly and said attachment assembly to thereby maintain the graphic display sheet adjacent to said panel.

* * * * *